United States Patent [19]

Lindemann et al.

[11] 3,708,388
[45] Jan. 2, 1973

[54] PROCESS OF LAMINATING USING VINYL ACETATE-ETHYLENE COPOLYMER LATEX ADHESIVE COMPOSITION

[75] Inventors: Martin K. Lindemann; John G. Iacoviello, both of Somerville, N.J.

[73] Assignee: Air Products and Chemicals, Inc., Allentown, Pa.

[22] Filed: May 6, 1970

[21] Appl. No.: 37,363

Related U.S. Application Data

[63] Continuation of Ser. No. 622,412, March 13, 1967, abandoned.

[52] U.S. Cl..............161/247, 156/327, 260/29.6 B, 260/29.6 PM, 260/29.6 WA
[51] Int. Cl. .......C08f 15/02, C08f 1/13, B32b 27/30
[58] Field of Search........260/29.6 R, 29.6 T, 29.6 B, 260/29.6 PM, 29.6 WA; 161/182, 247; 156/327, 331, 334

[56] References Cited

UNITED STATES PATENTS

| | | |
|---|---|---|
| 3,355,322 | 11/1967 | Worrall et al.....................117/126 R |
| 3,645,952 | 2/1972 | Lindemann et al. ............260/29.6 T |
| 3,526,540 | 9/1970 | Lindemann et al. ............260/29.6 T |
| 3,526,538 | 9/1970 | Lindemann et al. ............260/29.6 T |
| 3,380,851 | 4/1968 | Lindemann et al....................117/140 |
| 3,440,200 | 4/1969 | Lindemann et al. ............260/29.6 T |
| 3,440,199 | 4/1969 | Lindemann et al. ............260/29.6 T |
| 3,197,429 | 7/1965 | Baatz..............................260/29.6 B |
| 3,301,809 | 1/1967 | Goldberg et al......................156/327 |
| 3,423,352 | 1/1969 | Levine et al. ....................260/29.6 T |
| 3,446,767 | 5/1969 | Nolan .............................260/29.6 T |

Primary Examiner—Harold Ansher
Attorney—B. Max Klenit, Barry Moyerman and David T. Nikaido

[57] ABSTRACT

Aqueous latices comprising vinyl acetate-ethylene copolymers are effective to laminate a film, web or other substrate to a second surface whereby the dried polymer film deposited by the latex unites the substrate to the second surface.

11 Claims, No Drawings

PROCESS OF LAMINATING USING VINYL ACETATE-ETHYLENE COPOLYMER LATEX ADHESIVE COMPOSITION

CROSS-REFERENCE TO RELATED APPLICATION

This application is a continuation of application Ser. No. 622,412, filed Mar. 13, 1967, now abandoned.

This invention is concerned with adhesion and more particularly with the use for adhesive purposes of certain types of vinyl acetate-ethylene copolymer emulsions or latices.

The object of the invention is to provide effective adhesion between two adhesively-united elements.

In a typical procedure to produce a vinyl acetate-ethylene copolymer for use in accordance with this invention, vinyl acetate and ethylene are copolymerized in an aqueous medium under pressures not exceeding 100 atmospheres in the presence of a catalyst and suitably at least one emulsifying agent, the aqueous system being maintained, by a suitable buffering agent, at a pH of 2 to 6. Advantageously, the catalyst is added incrementally and the process is advantageously carried out as a batch process which involves first a homogenization period in which vinyl acetate suspended in water is thoroughly agitated in the presence of ethylene under the working pressure to effect solution of the ethylene in the vinyl acetate up to the substantial limit of its solubility under the conditions existing in the reaction zone, while the vinyl acetate is gradually heated to polymerization temperature. The homogenization period is followed by a polymerization period during which the catalyst, which consists of a main catalyst or initiator, and may include an activator, is added incrementally, the pressure in the system being maintained substantially constant by application of a constant ethylene pressure.

Various free-radical forming catalysts can be used in carrying out the polymerization of the monomers, such as peroxide compounds. The process for preparing the latices also includes the use of the combination type catalysts employing both reducing agents and oxidizing agents. The use of this type of combined catalyst is generally referred to in the art as "redox polymerization" or "redox system." The reducing agent is often referred to as an activator and the oxidizing agent as an initiator. Suitable reducing agents or activators include bisulfites, sulfoxylates, or other compounds having reducing properties such as ferrous salts, and tertiary aromatic amines, e.g. N,N-dimethyl anilines. The oxidizing agents or initiators include hydrogen peroxide, organic peroxides such as benzoyl peroxide, t-butyl hydroperoxide and the like, persulfates, such as ammonium or potassium persulfate, perborates, and the like. Specific combination type catalysts or redox systems which can be used include hydrogen peroxide and zinc formaldehyde sulfoxylate; hydrogen peroxide, ammonium persulfate, or potassium persulfate, with sodium metabisulfite, sodium bisulfite, ferrous sulfate, dimethylaniline, zinc formaldehyde sulfoxylate or sodium formaldehyde sulfoxylate. It is advantageous to utilize the more water-soluble peroxides, such as hydrogen peroxide, rather than the more oil-soluble peroxides such as t-butyl hydroperoxide, in the redox system, to catalyze the monomer polymerization. Redox catalyst systems are described, for example, in "Fundamental Principles of Polymerization" by G. F. D'Alelio (John Wiley and Sons, Inc., New York, 1952) pp. 333 et seq. Other types of catalysts that are well-known in the art can also be used to polymerize the monomers, with or without the addition of reducing agents or other activating materials.

The catalyst is employed in the amount of 0.1 to 2 percent, preferably 0.25 to 0.75 percent, based on the weight of vinyl acetate introduced into the system. The activator is ordinarily added in aqueous solution and the amount of activator is generally 0.25 to 1 times the amount of catalyst.

The emulsifying agents which are suitably used are non-ionic. Suitable non-ionic emulsifying agents include polyoxyethylene condensates. Polyoxyethylene condensates may be represented by the general formula:

where R is the residue of a fatty alcohol containing 10–18 carbon atoms, an alkyl phenol, a fatty acid containing 10–18 carbon atoms, an amide, an amine, or a mercaptan, and where $n$ is an integer of 1 or above. Some specific examples of polyoxyethylene condensates which can be used include polyoxyethylene aliphatic ethers such as polyoxyethylene lauryl ether, polyoxyethylene oleyl ether, polyoxyethylene hydroabietyl ether and the like; polyoxyethylene alkaryl ethers such as polyoxyethylene nonylphenyl ether, polyoxyethylene octylphenyl ether and the like; polyoxyethylene esters of higher fatty acids such as polyoxyethylene laurate, polyoxyethylene oleate and the like as well as condensates of ethylene oxide with resin acids and tall oil acids; polyoxyethylene amide and amine condensates such as N-polyoxyethylene lauramide, and N-lauryl-N-polyoxyethylene amine and the like; and polyoxyethylene thio-ethers such as polyoxyethylene n-dodecyl thio-ether.

The non-ionic emulsifying agents which can be used to produce the latices also includes a series of surface active agents known as "Pluronics." The "Pluronics" have the general formula:

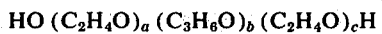

where $a$, $b$, and $c$ are integers of 1 or above. As $b$ increases, the compounds become less water soluble or more oil soluble and thus more hydrophobic when a and c remain substantially constant.

In addition, highly suitable are a series of ethylene oxide adducts of acetylenic glycols sold commercially under the name "Surfynols." This class of compounds can be represented by the formula

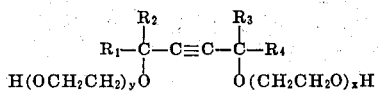

in which $R_1$ and $R_4$ are alkyl radicals containing from three to 10 carbon atoms, $R_2$ and $R_3$ are selected from the group consisting of methyl and ethyl, $x$ and $y$ have a sum in the range of three to 60, inclusive.

Some examples of non-ionic emulsifying agents which can be used are as follows:

A polyoxyethylene nonylphenyl ether having a cloud point of between 126° and 133° F. is marketed under the trade name "Igepal CO–630" and a polyoxyethylene nonylphenyl ether having a cloud point above 212° F. is marketed under the trade name "Igepal CO–887." A similar polyoxyethylene nonylphenyl ether having a cloud point of about 86° F. is marketed under the trade name "Igepal CO–610." A polyoxyethylene octylphenyl ether having a cloud point of between 80° F. and 160° F. is marketed under the trade name "Triton X–100."

A polyoxyethylene oleyl ether having a cloud point of between 80° F. and 160° F. is marketed under the trade name "Atlas G–3915" and a polyoxyethylene lauryl ether having a cloud point above 190° F. is marketed under the trade name "Brij 35."

A polyoxypropylene having a cloud point of about 140° F. is marketed under the trade name "Pluronic L–64," and a polyoxypropylene having a cloud point of about 212° F. is marketed under the trade name "Pluronic F–68." "Pluronic L–64" is a polyoxyethylene-polyoxypropylene glycol conforming to the above general formula for "Pluronics" in which the polyoxypropylene chain has a molecular weight of 1,500 to 1,800 and the polyoxyethylene content is from 40 to 50 per cent of the total weight of the molecule. "Pluronic F–68" is a polyoxyethylene-polyoxypropylene glycol conforming to the above general formula for "Pluronics" in which the polyoxypropylene chain has a molecular weight of 1,500 to 1,800 and the polyoxyethylene content is from 80 to 90 percent of the total weight of the molecule. The polyoxypropylene "Pluronics" are obtained by condensing ethylene oxide on the polyoxypropylene base and the hydrophobic-hydrophilic nature of the resulting compound is controlled by varying the molecular weight of either the hydrophobic base or the hydrophilic portion of the molecule.

Representative of the "Surfynols" are "Surfynol 465" which is an ethylene oxide adduct of 2,4,7,9-tetramethyl decynediol containing an average of 10 moles of ethylene oxide per mole, and "Surfynol 485" which corresponds to "Surfynol 465" but contains an average of 30 moles of ethylene oxide per mole. "Surfynol 465" has a cloud point of about 145° F. and "Surfynol 485" has a cloud point of above 212° F.

In the foregoing, cloud points recited are based on 1 percent aqueous solutions. A single emulsifying agent can be used, or the emulsifying agents can be used in combination. When combinations of emulsifying agents are used, it is advantageous to use a relatively hydrophobic emulsifying agent in combination with a relatively hydrophilic agent. A relatively hydrophobic agent is one having a cloud point in 1 percent aqueous solution below 190° F. and a relatively hydrophilic agent is one having a cloud point in 1 percent aqueous solution of 190° F. or above.

The concentration range of the total amount of emulsifying agents is generally from 0.5 to 5 percent based on the aqueous phase of the latex regardless of the solids content. Latex stabilizers are also advantageously used. The stabilizers employed are, in part, governed by the particle size of the copolymer. For example, the vinyl acetate-ethylene copolymer latices prepared by the herein-described method can have various average particle size ranges. When the latices have a very small average particle size, e.g., below 0.25$\mu$, an ethylenically-unsaturated acid having up to six carbon atoms, is advantageously used as the stabilizer. Typical acids of this character are acrylic acid, methacrylic acid, itaconic acid, maleic acid, vinyl sulfonic acid and the like. These unsaturated acids impart increased stability to the latices. They tend to copolymerize with the monomers in the system. The amount of unsaturated acid used is suitably 0.1 to 3 percent based on vinyl acetate, preferably 0.2 to 1 percent.

On the other hand, when the latex has an average particle size above 0.25$\mu$, a protective colloid can be used in the polymerization mixture as the stabilizing agent, although an unsaturated acid can be used if desired. Various amounts of colloids can be incorporated into the latices as desired. The amount of colloid used will also depend upon the particular colloid employed. Colloids of higher molecular weight tend to produce a latex of a higher viscosity than like amounts of a lower molecular weight colloid. Other properties of the colloids aside from their molecular weight also affect the viscosity of the latices. It is advantageous to maintain the colloid content of the latices prepared according to this invention between about 0.05 and 2 percent by weight based on the total latex, and hydroxyethyl cellulose and polyvinyl alcohol are particularly advantageous colloids when used in the latices prepared according to the method described herein.

Various other colloids can also be used with the latices including partially acetylated polyvinyl alcohol, e.g., up to 50 percent acetylated, casein, hydroxyethyl starch, carboxymethyl cellulose, gum arabic, and the like, as known in the art of synthetic polymer latex technology.

Colloids such as described above can also be considered, of course, as non-ionic emulsifying agents and can be used in place of the previously-described non-ionic agents in the indicated quantities. Thus the latex may contain a colloid, e.g., of the type described, such as polyvinyl alcohol, to function as a non-ionic emulsifying agent, and may also contain a colloid as a stabilizing agent. Different colloids may be used for the two purposes or different grades of the same colloid may be employed, e.g., a low viscosity and a high viscosity grade.

In order to maintain the pH of the system at the desired value, there is suitably added an alkaline buffering agent of any convenient type. Any alkaline material which is compatible with the stabilizing agent can be used as the buffer. The amount of buffer is that sufficient to adjust the pH of the system within the desired range. Ammonium and sodium bicarbonate are preferred buffers because of their compatibility with the system and their low cost. The amount of buffer is generally about 0.1 to 0.5 percent by weight, based on the monomers. Other buffers such as disodium phosphate, sodium acetate, and the like, can, however, also be used.

By employing the polymerization process which has been described in the foregoing, latices of relatively high solids contents can be directly produced and thus the products of this process generally have, as produced, solids contents of 45 to 60 percent. They can, of course, be easily thinned by the addition of water to lower solids contents of any desired value.

Similarly the copolymers can have a relatively high ethylene content, e.g., above 15 percent, although lower amounts can also be present. In general the copolymers have an ethylene content of 5 to 40 percent.

Lower reaction temperatures for polymerizing vinyl acetate than have heretofore been feasible economically can also be used in the process being described. The use of lower reaction temperatures has been found to result in higher molecular weight vinyl acetate copolymers. Typically the copolymers in the latices for adhesive use have intrinsic viscosity values of 1 to 2.5 deciliters/g. as measured in benzene at 30° C., which is indicative of relatively high molecular weights. The reaction temperature can be controlled by the rate of catalyst addition and by the rate of the heat dissipation therefrom. Generally we have found that it is advantageous to maintain a mean temperature of about 50° C. during the polymerization of the monomers and to avoid temperatures much in excess of 80° C. While temperatures as low as 0° can be used, economically the lower temperature limit is about 30° C.

The reaction time will also vary depending upon other variables such as the temperature, the catalyst, and the desired extent of the polymerization. It is generally desirable to continue the reaction until less than 0.5 percent of the vinyl acetate remains unreacted. Under these circumstances, a reaction time of about 6 hours has been found to be generally sufficient for complete polymerization, but reaction times ranging from 3 to 10 hours have been used, and other reaction times can be employed, if desired.

In carrying out the polymerization, a substantial amount of the vinyl acetate is initially charged to the polymerization vessel and saturated with ethylene in the manner discussed above. Most advantageously, at least about 75 percent of the total vinyl acetate to be polymerized is initially charged, preferably at least about 85 percent, and the remainder of the vinyl acetate is incrementally added during the course of the polymerization. The process also contemplates the charging of all of the vinyl acetate initially, with no additional incremental supply. When reference is made to incremental addition, whether of vinyl acetate, catalyst, or activator, substantially uniform additions, both with respect to quantity and time, are contemplated.

The quantity of ethylene entering into the copolymer is influenced by the pressure, the agitation, and the viscosity of the polymerization medium. Thus, to increase the ethylene content of the copolymer, higher pressures are employed, but it is a feature of the process being described that, even to introduce 40 percent or more of ethylene into the copolymer, pressures in excess of 100 atms. are not required. However, a pressure of at least about 10 atms. is most suitably employed. Similarly, when high ethylene contents are desired, a high degree of agitation should be employed, and high viscosities should be avoided, a low viscosity being preferred. When referring to viscosities, a viscosity of 30 to 150 centipoises is considered a low viscosity, a viscosity of 151 to 800 centipoises is considered a medium viscosity, and a viscosity of 801 to 3,000 centipoises is considered a high viscosity.

The process of forming the vinyl acetate-ethylene copolymer latices herein described generally comprises the preparation of an aqueous solution containing at least some of the emulsifying agent and stabilizer, and the pH buffering system. This aqueous solution and the initial charge of vinyl acetate are added to the polymerization vessel and ethylene pressure is applied to the desired value. As previously mentioned, the mixture is thoroughly agitated to dissolve ethylene in the vinyl acetate and in the water phase, agitation being continued until substantial equilibrium is achieved. This generally requires about 15 minutes. However, less time may be required depending upon the vessel, the efficiency of agitation, the specific system, and the like. In any case, by measuring the pressure drop of the ethylene in conventional manner, the realization of substantial equilibrium can be easily determined. Conveniently the charge is brought to polymerization temperature during this agitation period. Agitation can be effected by shaking, by means of an agitator, or other known mechanism. The polymerization is then initiated by introducing initial amounts of the catalyst, and of the activator when used. After polymerization has started, the catalyst and the activator are incrementally added as required to continue polymerization, and the remaining vinyl acetate, if any, is similarly added.

As mentioned, the reaction is generally continued until the residual vinyl acetate content is below 0.5 percent. The completed reaction product is then allowed to cool to about room temperature, while sealed from the atmosphere. The pH is then suitably adjusted to a value in the range of 4.5 to 7, preferably 6 to 6.5 to insure maximum stability.

The particle size of the latex can be regulated by the quantity of non-ionic emulsifying agent or agents employed and by the use or nonuse of a colloidal stabilizing agent. Thus, to obtain smaller particle sizes, greater amounts of emulsifying agent are used and colloidal stabilizing agents are not employed. For example, to provide average particle sizes below about $0.25\mu$, the total amount of non-ionic emulsifying agent should be at least about 2 percent, based on the aqueous phase of the latex, and no colloidal stabilizing agent should be used, or if a colloidal stabilizing agent is used, only very small amounts should be employed.

On the other hand, when particle sizes of $0.25\mu$ and above are desired, at most about 4 percent of total emulsifying agent based on the aqueous phase of the latex should be used, and a colloidal stabilizing agent should be included in the amounts previously indicated. As a general rule, the smaller the amount of emulsifying agent employed and the greater the amount of colloidal stabilizing agent included in the latex system, the greater the average particle size. Conversely, the greater the amount of the emulsifying agent employed and the smaller the amount of colloidal stabilizing agent used, including the total absence of the latter, the smaller the average particle size. It will be understood that in each case, the quantity and size values referred to above are all within the ranges of values previously specified in the foregoing description.

By following the procedure described above, particularly the initial saturation of the polymerization mixture with ethylene before polymerization is initiated, there can be produced the stable vinyl acetate-ethylene copolymer latex characterized above, with the copolymer having an ethylene content of 5 to 40 percent, and an intrinsic viscosity of 1 to 2.5 dl/g., the latex having a high solids content of up to 60 percent or more. As previously indicated the average particle size can vary and generally will range from $0.1\mu$ to $2\mu$.

The ethylene content can be determined in any manner known in the art, and we have found determination by means of the saponification number to be particularly suitable.

Intrinsic viscosity is suitably determined by convention techniques, e.g., in accordance with the procedure described on pages 309–314 of "Principles of Polymer Chemistry" by Paul J. Flory (Cornell University Press – 1963), using an Ubbelohde (suspended level) Viscometer at 30° C. The determination is made in various solvents such as benzene, acetone and methyl ethyl ketone.

One of the important features of the vinyl acetate-ethylene copolymer latices herein described is that they are susceptible of being cross-linked with certain cross-linking agents which have the effect of increasing the solvent resistance of the resulting films and of improving the high temperature mechanical properties of these films. The cross-linking agents can be either of the immediately-reactive type, or of the post-reactive type. Examples of the former are vinyl esters of polybasic acids, such as divinyl adipate, and divinyl succinate, divinyl ether, diallyl ether, allyl esters of polyfunctional acids, such as triallyl cyanurate, diallyl fumarate, triallyl citrate, and diallyl maleate, and other di- or tri-allyl compounds such as diallyl melamine. Examples of cross-linking agents of the post-reactive type are glycidyl compounds such as allyl glycidyl ether, glycidyl acrylate, glycidyl methacrylate, glycidyl vinyl ether, and the like, N-methylol compounds, such as N-methylol acrylamide, N-methylol methacrylamide, and their alkyl ethers, e.g., their methyl or butyl ethers.

The cross-linking agents can either be added to the initial charge or they can be added incrementally during the polymerization reaction, depending upon the desired distribution in the polymer, as known in the art. The quantity of the immediately reactive type of cross-linking agent used is generally 0.01 to 1 percent by weight of the vinyl acetate, depending upon the specific mechanical properties desired, e.g., the hardness and solvent swelling characteristics.

In the case of the post-reactive cross-linking agents, the quantity most suitably employed is 0.5 to 10 percent by weight of the vinyl acetate. The post-reactive agents partly cross-link during the formation of the vinyl acetate-ethylene copolymer and cross-linking is then completed, in conventional manner, by curing the copolymer at temperatures ranging from room temperature up to about 180° C, suitably in the presence of a curing catalyst, which is generally used in the amount of about 1 percent of the total resin. Appropriate curing catalysts for the various cross-linking agents are well-known in the art. For example, in the case of glycidyl compounds, basic catalysts are employed such as organic amines, e.g., ethylenediamine, or alkali metal salts of weak acids, such as sodium acetate. For N-methylol compounds, acid catalysts such as mineral acids, e.g., HCl, or organic acids, e.g., oxalic acid, or acid salts such as ammonium chloride, are suitably used, as known in the art.

The following examples are given to illustrate the preparation and use for adhesive purposes of the latices generally described above but it will be understood that they are intended to be illustrative only and not limitative of the invention. In the examples, all parts are by weight unless otherwise indicated, and particle sizes are average particle sizes in all cases.

EXAMPLE 1

The following was charged to a 25-gallon stainless steel pressure reactor equipped with temperature controls and an agitator:

| | | |
|---|---|---|
| 11,000 | g. | $H_2O$ |
| 98 | g. | Natrosol 250 LR (hydroxyethyl cellulose) |
| 120 | g. | Igepal CO–630 |
| 170 | g. | Igepal CO–887 |
| 0.25 | g. | Ferrous Ammonium Sulfate |

The reactants were agitated at 230 RPM and heated to 70° C for 1 hour to completely dissolve the Natrosol 250 LR. The charge was then cooled to 30° C and these were added:

| | | |
|---|---|---|
| 12,480 | g. | Vinyl Acetate |
| 360 | g. | Tertiary Butyl Hydroperoxide |

The reactor was then purged with nitrogen and ethylene to remove all oxygen and the charge heated to 50° C. During the heat-up period ethylene was added to a pressure of 39 ATM and the agitator set at 230 RPM. The equilibrium of ethylene between the vapor pocket and dissolved in the vinyl acetate was reached within fifteen minutes as indicated by the ethylene flow from the supply cylinder to the reactor. Polymerization was then started by adding 720 g. of a 7.8 percent Formopon solution. The polymerization was completed after 4 hours at which time 4,338 g. of 7.8 percent Formopon solution had been used and an additional 350 g. tertiary butyl hydroperoxide had been added. The latex was cooled to room temperature and neutralized to pH 5.2 with ammonia. A vinyl acetate/ethylene copolymer was obtained with the following properties.

| | |
|---|---|
| 46.0% | Solids |
| 1.0% | Insolubles in Benzene |
| $T_{135}$ = | −4° C. |
| $T_4$ = | +3° C. |
| Particle Size = | About $0.25\mu$ |
| Intrinsic viscosity = 0.83 (benzene, 30° C) | |

$T_{135}$ is the temperature at which the torsional modulus is 135,000 lbs./in$^2$, and $T_4$, the temperature at which the torsional modulus is 10,000 lbs./in$^2$ determined according to ASTM–D1043–61T

EXAMPLE 2

The following was charged to a 25-gallon stainless steel pressure reactor equipped with a temperature control and an agitator:

| | | |
|---|---|---|
| 9,500 | g. | $H_2O$ |
| 98 | g. | Natrosol 250 LR |
| 120 | g. | Igepal CO–630 |
| 170 | g. | Igepal CO–887 |
| 0.25 | g. | Ferrous Ammonium Sulfate |

The reactants were agitated at 200 RPM and heated to 70° C for 1 hour to completely dissolve the Natrosol 250 LR. The charge was then cooled to 30° C and these were added:

| | |
|---|---|
| 12,480 g. | Vinyl Acetate |
| 40 g. | Tartaric Acid |
| 12 ml. | Ammonium Hydroxide |
| 10 g. | Cumene Hydroperoxide |

The reactor was then purged with nitrogen and ethylene to remove all oxygen and the charge heated to 50° C. During the heat-up period, ethylene was added to a pressure of 39 ATM and the agitator set at 200 RPM. The equilibrium of ethylene between the vapor pocket and dissolved in the vinyl acetate was reached within fifteen minutes, as indicated by the ethylene flow from the supply cylinder to the reactor. Polymerization was then started by adding 30 g. of a 1 percent Formopon solution. The polymerization was completed after 4 hours at which time 1,800 ml of 1 percent Formopon solution and 1760 g. of 5 percent Formopon solution were used and an additional 140 g. cumene hydroperoxide (90) had been added. The latex was cooled to room temperature and neutralized to a pH of 5.2 with ammonia. A vinyl acetate-ethylene copolymer was obtained with the following properties:

53.0% Solids
$T_{135} = -5°$ C.
$T_4 = +22°$ C.
Particle size = about $0.25\mu$
Intrinsic Viscosity = 0.25 (benzene, 30° C.)

EXAMPLE 3

The following was charged to a 25-gallon stainless steel pressure reactor equipped with temperature controls and an agitator:

| | |
|---|---|
| 9,500 g. | $H_2O$ |
| 98 g. | Natrosol 250 HR |
| 120 g. | Igepal CO–630 |
| 170 g. | Igepal CO–887 |
| 0.25 g. | Ferrous Ammonium Sulfate |
| 11 g. | Triallyl Cyanurate |

The reactants were agitated at 230 RPM and heated to 70° C for 1 hour to completely dissolve the Natrosol 250 HR. The charge was cooled to 30° C and these were added:

| | |
|---|---|
| 10,200 g. | Vinyl Acetate |
| 3 ml | HCl (37%) |
| 0.5 g. | Ferrous Ammonium Sulfate |
| 10 g. | Formopon (sodium formaldehyde sulfoxylate) |

The reactor was then purged with nitrogen and ethylene to remove all oxygen and the charge heated to 50° C. During the heat-up period, ethylene was added to a pressure of 39 ATM and the agitator set at 230 RPM. The equilibrium of ethylene between the vapor pocket and dissolved in the vinyl acetate was reached within 15 minutes, as indicated by the ethylene flow from the supply cylinder to the reactor. Polymerization was then started by adding 600 g. of a 1% $H_2O_2$ solution. The polymerization was completed after 4 hours, at which time 730 g. of 1% $H_2O_2$ and 750 g. of a 5.0% $H_2O_2$ solution were used and an additional 50 g. Formopon had been added. The latex was cooled to room temperature, neutralized to a pH of 5.2 with ammonia. A vinyl acetate-ethylene copolymer was obtained with the following properties:

53.4% Solids
55% Insolubles
$T_{135} = -4°$ C.
$T_4 = +30°$ C.
Particle size = about $0.25\mu$
Intrinsic viscosity = 0.43 (benzene, 30° C.)

EXAMPLE 4

The following was charged to a 25-gallon stainless steel pressure reactor equipped with temperature controls and agitator:

| | |
|---|---|
| 20,000 g. | Water |
| 680 g. | Igepal CO–887 |
| 340 g. | Igepal CO–630 |
| 128 g. | Sodium salt of vinyl sulfonic acid |
| 38 g. | Sodium lauryl sulfate |
| 56 g. | citric acid |
| 25 g. | Disodium phosphate hydrate |
| 22,600 g. | Vinyl acetate |

The reactor was then purged with nitrogen and ethylene to remove all oxygen after which 300 g. of potassium persulfate were added. The charge was heated to 50° C. During the heat up period ethylene was added to a pressure of 36 atm. and the agitator set at 230 rpm. The equilibrium of ethylene between the vapor pocket and dissolved in VAc was reached within 15 minutes as indicated by the stoppage of ethylene flow from the supply cylinder to the reactor. Polymerization was then started by adding 25 g. of a 4 percent Formopon solution. The polymerization was completed after 4½ hrs. when 1,500 g. of 4 percent Formopon solution had been used and additional 10 g. potassium persulfate had been added. The emulsion was cooled to room temperature and neutralized to pH=6 with ammonia. A copolymer emulsion was obtained with the following properties:

48% – Solids
19% – Ethylene in Copolymer
Intrinsic viscosity = 2.1 dl/g (Benzene, 30° C.)
Particle Size = 0.21 $\mu$
$T_{135} = 0°$ C.
$T_4 = +6\%$
Intrinsic viscosity = 2.1 (benzene, 30° C.)

EXAMPLE 5

The following was charged to a 25-gallon stainless steel pressure reactor equipped with temperature controls and an agitator:

| | | |
|---|---|---|
| 9,500 | g. | Water |
| 170 | g. | Igepal CO–887 |
| 120 | g. | Igepal CO–630 |
| 98 | g. | Natrosol 250 GR |
| 0.25 | g. | Ferrous Ammonium Sulfate |

The reactants were agitated at 270 RPM and heated to 70° C for 1 hour to completely dissolve the polyvinyl alcohols. The charge was then cooled to 30° C and there were added:

| | |
|---|---|
| 11,000 g. | Vinyl Acetate |
| 3 ml | HCl (37%) |

20 g.    Formopon

The reactor was then purged with nitrogen and ethylene to remove all oxygen and the charge heated to 55° C. During the heat-up period, ethylene was added to a pressure of 39 ATM and the agitator set at 230 RPM. The equilibrium of ethylene between the vapor pocket and dissolved in the vinyl acetate was reached within 15 minutes, as indicated by the stoppage of ethylene flow from the supply cylinder to the reactor. Polymerization was started by adding 165 ml of a 5 percent tertiary butyl hydroperoxide (90) aqueous solution. There were delayed to the reaction over a 4-hour period a solution consisting of 400 g. vinyl acetate, 220 g. acrylic acid, and 5.5 g. triallyl cyanurate. The polymerization was complete after 4½ hours, at which time a total of 1,500 ml of 5 percent TBHP (90) was used and an additional 60 g. Formopon as a 10 percent aqueous solution had been added. The latex was cooled to room temperature and neutralized to pH 5.5 with ammonia. A vinyl acetate-ethylene copolymer latex was obtained with the following properties:

| | |
|---|---|
| 55.0% | Solids |
| 18–20% | Ethylene in Copolymer |
| 42.5% | Insolubles in Benzene |
| $T_{135}$ = | −1° C. |
| $T_4$ = | +0.5° C. |
| Particle size = | about 0.28 μ |
| Intrinsic viscosity = | 0.52 (benzene, 30° C.) |

EXAMPLE 6

The following was charged to a 25-gallon stainless steel pressure reactor equipped with temperature controls and an agitator:

| | | |
|---|---|---|
| 19,150 | g. | Water |
| 2,210 | g. | Igepal CO–887 |
| 775 | g. | Igepal CO–630 |
| 60 | g. | Sodium Lauryl Sulfate |
| 270 | g. | SVS (25%) (sodium vinyl sulfonate) |
| 168 | g. | PSVS (25%) (polysodium vinyl sulfonate) |
| 35 | g. | Citric Acid |
| 10 | g. | Disodium Phosphate |
| 0.25 | g. | Ferrous Ammonium Sulfate |
| 150 | g. | Potassium Persulfate |

The reactor was then purged with nitrogen and ethylene to remove all oxygen and the charge heated to 50° C. During the heat-up period, ethylene was added to a pressure of 39 ATM, and the agitator set at 195 RPM. The equilibrium of ethylene between the vapor pocket and dissolved in the vinyl acetate was reached within 15 minutes as indicated by the stoppage of ethylene flow from the supply cylinder to the reactor. Polymerization was then started by adding 28 g. of a 1 percent Formopon solution. There were added to the reaction over a 4-hour period delays consisting of 2,450 g. vinyl acetate, 1,360 g. glycidyl acrylate, 290 g. maleic anhydride, 270 g. SVS (25%), and 2,220 g. H₂O. The polymerization was complete after 4½ hours, at which time a total of 2,200 g. of 5 percent Formopon solution had been used and 48 g. of ammonium persulfate had been added. The latex was cooled to room temperature and neutralized to pH 5.2 with ammonia. A vinyl acetate-ethylene copolymer latex was obtained with the following properties:

| | | |
|---|---|---|
| 48.3% | — | Solids |
| 18–20% | — | Ethylene in Copolymer |
| $T_{135}$ = | | −11 |
| $T_4$ = | | +20 |
| Particle size = | | about 0.25 μ |
| Intrinsic viscosity = | | 0.8 (benzene, 30° C.) |

EXAMPLE 7

The following was charged to a 25-gallon stainless steel pressure reactor equipped with temperature controls and an agitator:

| | | |
|---|---|---|
| 3,860 | g. | H₂O |
| 2,100 | g. | Igepal CO–887 |
| 736 | g. | Igepal CO–630 |
| 95 | g. | Sodium Lauryl Sulfate |
| 41 | g. | N-Methylol Acrylamide (60%) |
| 5 | ml | Acetic Acid |
| 0.25 | g. | Ferrous Ammonium Sulfate |
| 100 | g. | Potassium Persulfate |

The reactor was then purged with nitrogen and ethylene to remove all oxygen and the charge heated to 50° C. During the heat-up period, ethylene was added to a pressure of 39 ATM, and the agitator set at 195 RPM. The equilibrium of ethylene between the vapor pocket and dissolved in the vinyl acetate was reached within 15 minutes, as indicated by the stoppage of ethylene flow from the supply cylinder to the reactor. Polymerization was then started by adding 50 g. of a 5 percent Formopon solution. There were delayed to the reaction over a 4-hour period 1,270 g. N-methylol acrylamide (60%), 39 g. ammonium acetate, and 4,320 g. H₂O. The polymerization was completed after 4½ hours at which time 1,980 g. of 5 percent Formopon solution had been used and an additional 112 g. potassium persulfate had been added. The latex was cooled to room temperature and neutralized to pH = 5.2 with ammonia. A vinyl acetate-ethylene copolymer latex was obtained with the following properties:

| | | |
|---|---|---|
| 45.2% | — | Solids |
| 18–20% | — | Ethylene Content |
| $T_{135}$ = | | −1.0° C. |
| $T_4$ = | | +7.5° C. |
| Particle size = | | about 0.2 μ |
| Intrinsic viscosity = | | 0.8 (benzene, 30° C.) |

EXAMPLE 8

The following was charged to a 25-gallon stainless steel pressure reactor equipped with temperature controls and agitator:

| | |
|---|---|
| 9,500 g. | Water |
| 221 g. | Vinol 523 (polyvinyl alcohol) 20 cp. |
| 687 g. | Poval 205 (polyvinyl alcohol) 5 cp. |
| 0.25 g. | Ferrous Ammonium Sulfate |

(cp. = centipoises)

The reactants were agitated at 270 RPM and heated to 70° C for 1 hour to completely dissolve the polyvinyl alcohols. The charge was then cooled to 30° C and then were added:

| | |
|---|---|
| 18,160 g. | Vinyl Acetate |
| 13 ml | HCl (37%) |
| 20 g. | Formopon |

The reactor was then purged with nitrogen and ethylene to remove all oxygen and the charge heated to 55° C. During the heat-up period ethylene was added to a pressure of 39 ATM and the agitator set at 270 RPM. The equilibrium of ethylene between the vapor pocket and dissolved in the vinyl acetate was reached within 15 minutes, as indicated by the stoppage of ethylene flow from the supply cylinder to the reactor. Polymerization was then started by adding 150 ml of an 0.25 percent $H_2O_2$ solution. The polymerization was complete after 4½ hours at which time a total of 29 g. $H_2O_2$(100 percent) was used at various concentration levels and an additional 10 g. Formopon as a 10 percent aqueous solution had been added. The latex was cooled to room temperature and neutralized to pH = 5.5 with ammonia. A vinyl acetate-ethylene copolymer latex was obtained with the following properties:

```
        51.5%  -  Solids
      18-20%   -  Ethylene in Copolymer
          58%  -  Insolubles in Benzene
         T₁₃₅  =  0° C.
           T₄  =  +8° C.
  Particle size =  about 0.3 μ
Intrinsic viscosity = 0.83 (benzene, 30° C.)
```

EXAMPLE 9

Following generally the procedure described in Examples 3 and 4, a polymer latex was made from the following components used in the relative parts by weight indicated:

```
Water                      16,110.0 Parts
Igepal CO–880                  691.0 "
Igepal CO–630                  400.0 "
Hydrochloric Acid (33%)      1,468 "
Potassium Persulfate            89.3 "
Ammonium Persulfate             75.2 "
Maleic Anhydride               117.5 "
Ferrous Sulfate                  0.28 "
Triallyl Cyanurate              21.0 "
Formopon                        66.7 "
Sodium Vinyl Sulfonate         306.0 "
Ammonium Hydroxide (29%)       130.0 "
Vinyl Acetate               17,774.0 "
```

A copolymer emulsion was obtained which had the following approximate properties:

```
                        pH  =  5.5
                       55%  =  Solids
                       15%  =  Ethylene in polymer
Soluble portion Intrinsic
                Viscosity  =  1.6 (benzene, 30° C.)
            Particle size  =  0.18 μ
                    T₁₃₅  =  +5
```

The emulsions or latices produced in Examples 1–9 were subjected to evaluation as adhesives, particularly for securing a polymer film to another surface, such as aluminum foil and cloth. The films used in these tests were films of polyvinyl chloride (2 mil thickness), cellulose acetate (3 mil thickness), Mylar (1 mil thickness), polystyrene (3 mil thickness). They are used as substrates for lamination to cloth (1.60 cotton poplin, mercerized) and aluminum foil (1 mil, nonanodized). The laminated units were evaluated for peel strength, the following test procedures being used:

Film to Cloth Adhesion

A 4 × 6 inch film was covered with the emulsion using a rod. A comparable sized cloth was immediately placed on the coated film, and the laminate rolled once with a 3.3 kg. rubber roller. The sheets were air dried for one hour, cut into 1-inch strips and conditioned for 48 hours at 72° F. and 50 percent humidity.

The peel strength of the laminate was measured with an Instron set at a chart speed of 0.5 inches per minute and at a crosshead speed of 5 inches per minute, starting at load settings of 1 pound. An average value from three strips was reported.

Film to Aluminum Foil Adhesion

A 6 × 10 inch sheet of aluminum foil was carefully placed on a sheet of paper supported by a sponge rubber padding and secured with mending tape. The wrinkles were ironed out with a rod and the foil coated with emulsion using a metering bar. The foil and paper were air dried and placed into a forced draft oven at 100° C. for 1 hour. The sheets were removed from the oven and a 6 × 10 inch film rolled on the foil with a 3.3 kg. weighted rubber roller. The laminate is placed between two pieces of soft paper and heat-sealed at elevated temperature, e.g., by being compressed in a hydraulic press at 40 psi pressure for 5 seconds at 275° F. The sample was removed, cooled, and sliced into 1-inch strips with a paper cutter and an Instron was used to measure the peel strength of the film to foil. The Instron was run at a chart speed of 0.5 inches per minute and at a crosshead speed of 5 inches per minute starting at a load setting of 1 pound. An average value from three strips was reported.

The results of these tests are shown in Table 1 and Table 2 below. As will be seen in Table 1, a feature of the above-described emulsions is that their adhesive characteristics are retained even after ageing. When subjected to standard accelerated ageing tests, including conditioning at constant humidity for 48 hours at 25° C, then for 1 week at 120° F., followed by 16 hours at 25° C., it was found, as shown in Table 1, that no loss, or only slight loss in adhesion occurred upon ageing. In some cases, adhesion even increased. In the tests reported in Table 1, the latices were used directly in some cases, and in other cases the latices were first plasticized by adding 6 parts of a plasticizer (dipropylene glycol dibenzoate) per 100 parts by weight of the latex. The tests with a plasticized latex are indicated by a single asterisk in Table 1.

TABLE 1.—PEEL STRENGTH, POUNDS

| Example: | Polyvinyl chloride film cloth | | Polystyrene film to cloth | | Mylar film to cloth | | Cellulose acetate film to cloth, original |
|---|---|---|---|---|---|---|---|
| | Original | Accelerated ageing | Original | Accelerated ageing | Original | Accelerated ageing | |
| 1 | 2.1 | | | | | | 1.9 |
| 2 | 2.4 | | | | | | 1.2 |
| 3 | 2.6 | 2.2 | 0.66 | | 0.24 | | 1.6 |
| 3* | 2.3 | 2.5 | 1.04 | | .50 | | |
| 4 | 2.7 | 3.4 | | | | | 1.7 |
| 4* | 2.3 | 3.2 | 0.76 | 1.0 | 1.2 | 2.4 | |
| 5* | 3.4 | 3.0 | 0.48 | 0.75 | 0.66 | 0.88 | **2.4 |
| 6* | 2.6 | 1.7 | 0.97 | 1.4 | 1.9 | 2.0 | **1.0 |
| 7* | 2.2 | 2.3 | 0.83 | 0.51 | 0.74 | 1.2 | **2.0 |
| 8 | 3.8 | 3.5 | | | | | 2.0 |
| 8* | 4.0 | 3.5 | | | | | |
| 9 | 2.6 | | | | | | 1.7 |

* Plasticized.
** Unplasticized.

TABLE 2

Peel Strength, pounds

|  | Polyvinyl chloride film to aluminum foil | Cellulose acetate film to aluminum foil |
| --- | --- | --- |
| Ex. 4 | 1.0 | 1.6 |
| Ex. 6 | 1.6 | 2.0 |
| Ex. 7 | 1.3 | 1.7 |
| Ex. 9 | 1.0 | 1.6 |

It will, of course, be understood that the foregoing are merely representative of combinations of materials which can be united by means of the above-described polymer latices. For example, two pieces of cloth can be united in this manner and other tests can be employed to measure the strength of the lamination. Typical of such tests is a static load test wherein for a cloth-to-cloth lamination a large piece of poplin cloth is coated with emulsion three times with a wire-wound rod. After drying for 1 minute additional emulsion is applied by making three passes with a wire-wound rod. The poplin is immediately folded over and rolled with a 7-pound roller. The laminates are dried at ambient temperatures for 1 week and strips 1 inch by 6 inches are cut out for the test. 500 g. weights are fastened to the lamination strips at a constant temperature of 120° F. at 50 percent relative humidity. Peel lengths are measured after 24 hours. For example, if the product of Example 8 is used for this purpose and tested in this manner the laminate peels only three-sixteenths inch.

In like manner, the adhesive latices can be used for various other bonding purposes, e.g., for bonding films to each other, particularly when a heat sealing operation is employed, and for bonding to paper, leather, wood, fiberglass, glass, tinplate, galvanized iron, stainless steel, and the like.

It will also be understood that the latices can be compounded in conventional manner with plasticizers, inert fillers, organic solvents, such as alcohols, other latices, such as natural rubber latex or synthetic rubber latex, and the like as well known in the adhesives art.

It is intended, therefore, that all matter contained in the foregoing disclosure shall be interpreted as illustrative only and not as limitative of the invention.

We claim:

1. An adhesive composition consisting essentially of an aqueous vinyl acetate-ethylene copolymer emulsion having from about 5 to about 40 percent by weight ethylene, a solids content of from 45 to about 60 percent by weight and an intrinsic viscosity of from 1 to 2.5 dl/g as measured in benzene at 30° C, the vinyl acetate and ethylene monomers copolymerized in the presence of a protective colloid in an amount from about 0.05 to about 2 percent by weight based upon the total weight of the emulsion, said protective colloid being selected from the group consisting essentially of a polyvinyl alcohol and hydroxyethyl cellulose.

2. The composition of claim 1 wherein the polyvinyl alcohol is acetylated up to 50 percent.

3. The composition of claim 1 wherein the ethylene content of the copolymer is more than 15 percent by weight.

4. A process of uniting a substrate with an adjacent surface of a continuous web to form a laminate, which process comprises interposing between the substrate and web an adhesive composition consisting essentially of an aqueous vinyl acetate-ethylene copolymer emulsion having from about 5 to about 40 percent by weight ethylene, a solids content of from 45 to about 60 percent by weight and an intrinsic viscosity of from 1 to 2.5 dl/g, as measured in benzene at 30° C, the vinyl acetate and ethylene monomers copolymerized in the presence of a protective colloid in an amount from about 0.05 to about 2 percent by weight based upon the total weight of the emulsion and adhering the substrate and web to form a resulting laminate structure, said protective colloid being selected from the group consisting essentially of a polyvinyl alcohol and hydroxyethyl cellulose.

5. The process of claim 4 wherein the polyvinyl alcohol of the composition is acetylated up to 50 percent.

6. The process of claim 4 wherein the ethylene content of the copolymer emulsion is more than 15 percent by weight.

7. The process of claim 4 wherein the substrate and web of the laminate are polyvinyl chloride film and cloth, respectively.

8. A laminate comprising a substrate and an overlying continuous web bonded together by means of an adhesive composition, said composition consisting essentially of an aqueous vinyl acetate-ethylene copolymer emulsion having from about 5 to about 40 percent by weight ethylene, a solids content of from 45 to about 60 percent by weight and an intrinsic viscosity of from 1 to 2.5 dl/g, as measured in benzene at 30° C, the vinyl acetate and ethylene monomers copolymerized in the presence of a protective colloid in an amount from about 0.05 to about 2 percent by weight based upon the total weight of the emulsion, said protective colloid being selected from the group consisting essentially of a polyvinyl alcohol and hydroxyethyl cellulose.

9. The laminate of claim 8 wherein the polyvinyl alcohol of the adhesive composition is acetylated up to 50 percent.

10. The laminate of claim 8 wherein the ethylene content of the copolymer emulsion is more than 15 percent by weight.

11. The laminate of claim 8 wherein the substrate and web of the laminate are polyvinyl chloride film and cloth, respectively.

* * * * *